(12) United States Patent
Zhong et al.

(10) Patent No.: US 12,500,851 B2
(45) Date of Patent: Dec. 16, 2025

(54) RESOURCE RELEASE METHOD AND APPARATUS, NETWORK NODE AND STORAGE MEDIUM

(71) Applicant: VIVO MOBILE COMMUNICATION CO., LTD., Dongguan (CN)

(72) Inventors: Tingting Zhong, Dongguan (CN); Zhenhua Xie, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 29 days.

(21) Appl. No.: 18/382,099

(22) Filed: Oct. 20, 2023

(65) Prior Publication Data

US 2024/0048503 A1 Feb. 8, 2024

Related U.S. Application Data

(63) Continuation of application No. PCT/CN2022/087431, filed on Apr. 18, 2022.

(30) Foreign Application Priority Data

Apr. 21, 2021 (CN) .......................... 202110432816.1

(51) Int. Cl.
*H04L 47/62* (2022.01)
*H04L 47/762* (2022.01)
*H04L 47/80* (2022.01)

(52) U.S. Cl.
CPC .......... *H04L 47/762* (2013.01); *H04L 47/801* (2013.01)

(58) Field of Classification Search
CPC ........................... H04L 47/762; H04L 47/801
See application file for complete search history.

(56) References Cited

U.S. PATENT DOCUMENTS

| 11,116,039 B2 | 9/2021 | Li et al. |
| 2014/0369251 A1* | 12/2014 | Zhang ................. H04L 12/1877 370/312 |
| 2020/0267513 A1* | 8/2020 | Zhu ..................... H04L 65/1033 |
| 2020/0337111 A1 | 10/2020 | Shi et al. |

(Continued)

FOREIGN PATENT DOCUMENTS

| CN | 109769150 A | 5/2019 |
| CN | 110290530 A * | 9/2019 ............ H04W 16/10 |

(Continued)

OTHER PUBLICATIONS

"Solution 2 EN clarifications", Ericsson, Oct. 2020, pp. 1-28.
"Updates to solution #5", Huawei, HiSilicon, Jan. 2021, pp. 1-2.

*Primary Examiner* — June Sison
(74) *Attorney, Agent, or Firm* — The Webb Law Firm

(57) ABSTRACT

A resource release method includes when a first network node determines that a first condition is met, performing at least one of the following: releasing a first resource; or sending first data to a second network node; where the first data is used for at least one of the following: requesting a second network node to release the first resource; indicating the second network node to release the first resource; requesting the second network node to stop the data transmission of the first service; or indicating the second network node to stop the data transmission of the first service; where the first resource includes a resource used for the first service between the first network node and the second network node.

20 Claims, 6 Drawing Sheets

(56) References Cited

U.S. PATENT DOCUMENTS

| | | | |
|---|---|---|---|
| 2021/0014865 A1* | 1/2021 | Zheng | H04W 16/10 |
| 2022/0240135 A1* | 7/2022 | Wu | H04W 36/362 |
| 2024/0064852 A1* | 2/2024 | Wang | H04W 72/23 |

FOREIGN PATENT DOCUMENTS

| | | |
|---|---|---|
| CN | 110831108 A | 2/2020 |
| CN | 109219952 B | 9/2020 |
| JP | 2012170022 A | 9/2012 |
| JP | 2019537334 A | 12/2019 |

* cited by examiner

RESOURCE RELEASE METHOD AND APPARATUS, NETWORK NODE AND STORAGE MEDIUM

CROSS-REFERENCE TO RELATED APPLICATIONS

This application is a Bypass Continuation Application of International Patent Application No. PCT/CN2022/087431, filed Apr. 18, 2022, and claims priority to Chinese Patent Application No. 202110432816.1, filed Apr. 21, 2021, the disclosures of which are hereby incorporated by reference in their entireties.

BACKGROUND OF THE INVENTION

Field of the Invention

The present application belongs to the technical field of communication, and relates to a resource releasing method and apparatus, a network node and a storage medium.

Description of Related Art

Multicast allows sending messages to a selected subset of all possible network nodes, that is, sending information to multiple addresses that are clearly indicated, enabling communication between a sender and multiple receivers.

However, if the sender is sending multicast data normally, but no receiver is receiving a multicast service, resources will be wasted.

SUMMARY OF THE INVENTION

Embodiments of the present application provide a resource release method and apparatus, a network node, and a storage medium.

According to a first aspect, a resource release method is provided, executed by a first network node, and the method includes:
  in a case that it is determined that a first condition is met, performing at least one of the following:
  releasing a first resource; or
  sending first data to a second network node;
  where the first data is used for at least one of the following:
  requesting the second network node to release the first resource;
  indicating the second network node to release the first resource;
  requesting the second network node to stop data transmission of a first service; or
  indicating the second network node to stop data transmission of the first service;
  where the first resource includes resources used for the first service between the first network node and the second network node.

According to a second aspect, a resource release method is provided, executed by a second network node, and the method includes:
  receiving first data sent by a first network node; and
  based on the first data, performing at least one of the following:
  ignoring the first data;
  releasing a first resource; or
  stopping transmitting data of the first service; and
  sending second data to a third network node;
  where the second data is used for at least one of the following:
  requesting release of the first resource;
  instructing the first resource to be released;
  requesting to stop data transmission of the first service; or
  indicating that data transmission of the first service is stopped;
  where the first resource includes resources used for the first service between the first network node and the second network node.

According to a third aspect, a resource release method is provided, executed by a third network node, and the method includes:
  receiving second data sent by a second network node.

According to a fourth aspect, a resource release apparatus is provided, and the apparatus includes:
  a first execution module, configured to: in a case that it is determined that a first condition is met, perform at least one of the following:
  releasing a first resource; or
  sending first data to a second network node;
  where the first data is used for at least one of the following:
  requesting the second network node to release the first resource;
  indicating the second network node to release the first resource;
  requesting the second network node to stop data transmission of a first service; or
  indicating the second network node to stop data transmission of the first service;
  where the first resource includes resources used for the first service between the first network node and the second network node.

According to a fifth aspect, a resource release apparatus is provided, and the apparatus includes:
  a first receiving module, configured to receive first data sent by a first network node; and
  a second execution module, configured to: based on the first data, perform at least one of the following:
  ignoring the first data;
  releasing a first resource; or
  stopping transmitting data of the first service; and
  sending second data to a third network node;
  where the second data is used for at least one of the following:
  requesting release of the first resource;
  instructing the first resource to be released;
  requesting to stop data transmission of the first service; or
  indicating that data transmission of the first service is stopped;
  where the first resource includes resources used for the first service between the first network node and the second network node.

According to a sixth aspect, a resource release apparatus is provided, and the apparatus includes:
  a fourth receiving module, configured to receive second data sent by a second network node.

According to a seventh aspect, a network node is provided. The network node includes a processor, a memory, and a program or an instruction that is stored in the memory and that can be run on the processor, where when the program or the instruction is executed by the processor, the steps of the method in the first aspect are implemented.

According to an eighth aspect, a network node is provided, including a processor and a communication interface, where the processor is configured to:

in a case that it is determined that a first condition is met, perform at least one of the following:

releasing a first resource; or sending first data to a second network node;

where the first data is used for at least one of the following:

requesting the second network node to release the first resource;

indicating the second network node to release the first resource;

requesting the second network node to stop data transmission of a first service; or indicating the second network node to stop data transmission of the first service;

where the first resource includes resources used for the first service between the first network node and the second network node.

According to a ninth aspect, a network node is provided. The network node includes a processor, a memory, and a program or an instruction that is stored in the memory and that can be run on the processor, where when the program or the instruction is executed by the processor, the steps of the method in the second aspect are implemented.

According to a tenth aspect, a network node is provided, including a processor and a communication interface, where the communication interface is configured to:

receive first data sent by a first network node; and the processor is configured to:

based on the first data, perform at least one of the following:

ignoring the first data;

releasing a first resource; or stopping transmitting data of the first service; and sending second data to a third network node;

where the second data is used for at least one of the following:

requesting release of the first resource;

instructing the first resource to be released;

requesting to stop data transmission of the first service; or indicating that data transmission of the first service is stopped;

where the first resource includes resources used for the first service between the first network node and the second network node.

According to an eleventh aspect, a network node is provided. The network node includes a processor, a memory, and a program or an instruction that is stored in the memory and that can be run on the processor, where when the program or the instruction is executed by the processor, the steps of the method in the third aspect are implemented.

According to a twelfth aspect, a network node is provided, including a processor and a communication interface, where the communication interface is configured to:

receive second data sent by a second network node.

According to a thirteenth aspect, a non-transitory readable storage medium is provided, where the non-transitory readable storage medium stores a program or an instruction, and when the program or the instruction is executed by a processor, the steps of the method according to the first aspect, the steps of the method according to the second aspect, or the steps of the method according to the third aspect are implemented.

According to a fourteenth aspect, a chip is provided, where the chip includes a processor and a communication interface, the communication interface is coupled to the processor, and the processor is used to run programs or instructions, so as to implement the steps of the method according to the first aspect, the steps of the method according to the second aspect, or the steps of the method according to the third aspect.

According to a fifteenth aspect, a computer program/program product is provided, stored in a non-transient storage medium, the program/program product is executed by at least one processor to implement the steps of the method according to the first aspect, the steps of the method according to the second aspect, or the steps of the method according to the third aspect.

DESCRIPTION OF THE INVENTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that, the terms used in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the description and the claims, "and/or" represents at least one of connected objects, and a character "/" generally represents an "or" relationship between associated objects.

It should be noted that the technology described in the embodiments of this application is not limited to a long term evolution (LTE)/LTE-advanced (LTE-A) system, and may also be used in various wireless communications systems, for example, code division multiple access (CDMA), time division multiple access (TDMA), frequency division multiple access (FDMA), orthogonal frequency division multiple access (OFDMA), single-carrier frequency-division multiple access (SC-FDMA), and another system. The terms "system" and "network" in the embodiments of this application may be used interchangeably. The technologies described can be applied to both the systems and the radio technologies mentioned above as well as to other systems and radio technologies. A new radio (NR) system is described in the following description for illustrative purposes, and the NR terminology is used in most of the following description, although these technologies can also be applied to applications other than the NR system application, such as the 6th generation (6G) communications system.

Figure 1:
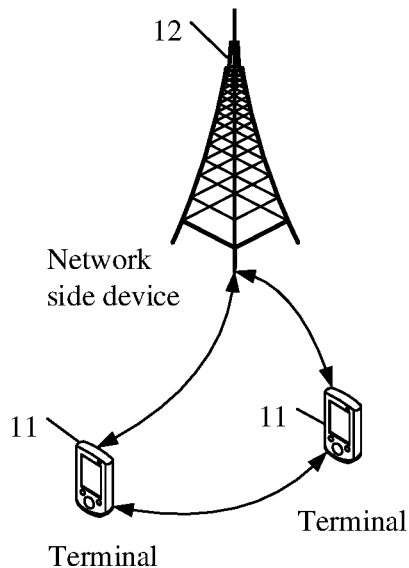
FIG. 1 is a structural diagram of a wireless communication system to which this embodiment of the present application is applicable.

FIG. 1 is a structural diagram of a wireless communications system to which embodiments of this application can be applied. The wireless communication system includes a terminal 11 and a network side device 12. The terminal 11 may also be called a terminal device or user equipment (UE), and the terminal 11 may be a mobile phone, a tablet personal computer, a laptop computer or a notebook computer, a personal digital Assistant (PDA), a palmtop computer, a netbook, an ultra-mobile personal computer (UMPC), a mobile Internet device (MID), a wearable device or a vehicle-mounted device (VUE), a pedestrian terminal (PUE), and other terminal side devices. The wearable device includes: smart watches, bracelets, earphones, glasses, etc. It should be noted that a specific type of the terminal 11 is not limited in the embodiments of this application. The network side device 12 may be of a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception point (TRP), or another appropriate term in the art. As long as a same technical effect is achieved, the base station is not limited to a specified technical term. It should be noted that, in the embodiments of this application, only a base station in an NR system is used as an example, but a specific type of the base station is not limited. The core network device may include but is not limited to at least one of the following: core network nodes, core network functions, mobility management entities (MME), access and mobility management functions (AMF), session management functions (SMF), user plane functions (UPF), policy control functions (PCF), policy and charging rules functions (PCRF), edge application server discovery functions (EASDF), unified data management (UDM), unified data repository (UDR), home subscriber servers (HSS), centralized network configuration (CNC), network repository functions (NRF), network exposure functions (NEF), local NEFs (Local NEF, or L-NEF), binding support functions (BSF), application functions (AF), etc. It should be noted that, in the embodiment of the present application, only the core network device in the NR system is used as an example for introduction, and the specific type of the core network device is not limited.

First, the following contents are described:

(1) Multimedia Broadcast and Multicast Service (MBMS) or Multicast Broadcast Service (MBS).

In a communication system, the following two modes may be used for transmission:

MBMS/MBS transmission mode 1: transmission through a physical multicast channel (PMCH) physical channel in an MBMS Single Frequency Network (MBSFN) subframe. Control information is sent through system information (for example, SIB13) and a broadcast control channel (MCCH), and data is sent through a broadcast traffic channel (MTCH).

MBMS/MBS transmission mode 2: transmission through a physical downlink shared channel (PDSCH) channel scheduled by a physical downlink control channel (PDCCH). Control information is sent through system information (for example, SIB20) and a single cell multicast control channel (SC-MCCH), and data is sent through a single cell multicast traffic channel (SC-MTCH). The SC-MCCH is sent through a PDSCH scheduled by a single cell rnti-radio network temporary identity (SC-RNTI) PDCCH, and the SC-MTCH is sent through a PDSCH scheduled by a G-RNTI PDCCH.

(2) Mode of providing an NR MBS service on an N3 interface.

5GC single MBS service delivery: a 5G CN receives separate copies of an MBS data packets and delivers separate copies of these MBS data packets to each UE through a packet data unit (PDU) session of each UE. Therefore, for each UE, a PDU session needs to be associated with a multicast session.

In this way, the user plane function is a traditional user plane function (UPF); but in fact, the UPF also obtains multicast data from an MB-UPF. A 5G CN receives separate copies of MBS data packets, and delivers separate copies of those MBS data packets to each UE through a PDU session of each UE. Therefore, for each UE, a PDU session needs to be associated with a multicast session.

5GC shared MBS traffic delivery: a 5G CN receives separate copies of MBS packets and delivers the separate copies of these MBS packets to radio access network (RAN) nodes.

In this way, the user plane function is an enhanced MB-UPF; the 5G CN receives separate copies of MBS packets and transmits the separate copies of these MBS packets to the RAN node.

The MB-SMF provides a forwarding rule to the MB-UPF, and the MB-UPF sends MBS data to corresponding base stations or UPFs according to the forwarding rule.

The resource release method and apparatus provided by the embodiments of the present application will be described below through some embodiments and application scenarios with reference to the accompanying drawings.

Figure 2:
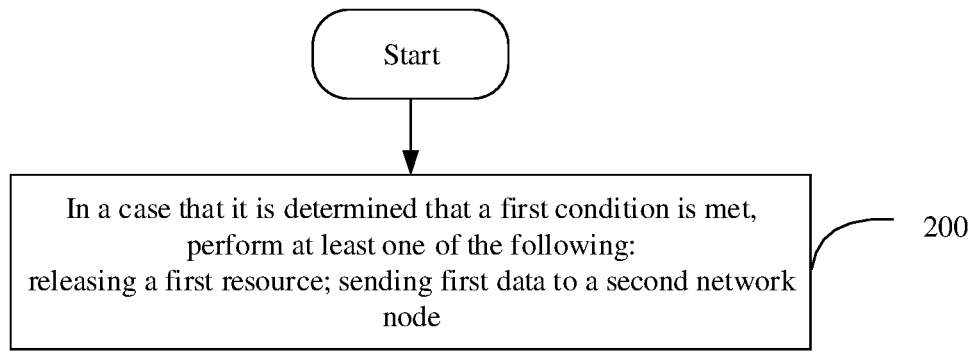
FIG. 2 is a first schematic flowchart of a resource release method according to the embodiment of the present application.

FIG. 2 is a first flowchart of a resource release method according to the embodiment of the present application. As shown in FIG. 2, the method is executed by a first network node, and the method includes the following steps:

Step 200: In a case that it is determined that a first condition is met, perform at least one of the following:

releasing a first resource; or sending first data to a second network node;

where the first data is used for at least one of the following:
requesting the second network node to release the first resource;
indicating the second network node to release the first resource;
requesting the second network node to stop data transmission of a first service; or
indicating the second network node to stop data transmission of the first service;
where the first resource includes resources used for the first service between the first network node and the second network node.

In a communication system, for multicast services, only UEs in radio resource control (RRC) connected state may receive multicast services, and the base station can strictly know the number of RRC-CONNECTED UEs that is receiving multicast data.

However, when a base station finds that no UE is receiving the multicast service, the base station can instruct the core network to release an N3 resource and/or directly stop sending the multicast service, thereby improving resource utilization.

The embodiment of the present application provides a process and method for instructing the core network to release the N3 resource and/or stop sending the multicast service when the base station finds that no UE is receiving the multicast service.

Optionally, the first network node may be an enhanced base station, and the enhanced base station is a base station with an MBS capability, that is, it can send MBS (or MBMS) data through the core network in a shared delivery manner.

Optionally, the first network node may be a legacy UPF.

Optionally, the first network node determining that the first condition is met may be: the first network node determines that the first service is not received by the receiver after being sent; for example, no terminal receives the first service.

Optionally, the decision maker that decides whether to release the first resource and/or decides whether to stop the data transmission of the first service may include the first network node. Correspondingly, the first network node may directly release the first resource when it is determined that the first condition is met.

At a moment when the first network node sends the first data to the second network node or after the moment, the first network node may also release the first resource used for the first service between the first network node and the second network node.

Optionally, the decision maker that decides whether to release the first resource and/or decides whether to stop the data transmission of the first service may include the first network node. Correspondingly, the first network node may directly release the first resource when it is determined that the first condition is met, and may also instruct the second network node to release the first resource. It should be noted that in this case, the decision of the first network node instructs the second network node is actually instructing (notifying) the second network node that the first resource has been released.

Optionally, the decision maker that decides whether to release the first resource and/or decides whether to stop the data transmission of the first service may include the first network node. Correspondingly, when it is determined that the first condition is met, the first network node may determine to stop the data transmission of the first service, and instruct, through the first data, the second network node to stop the data transmission of the first service.

Optionally, the decision maker that decides whether to release the first resource and/or decides whether to stop the data transmission of the first service may include the second network node. Correspondingly, the first network node may request the second network node to release the first resource. After receiving the first data, the second network node may decide whether to release the first resource, and may release the first resource after it is determined to release the first resource.

Optionally, the decision maker that decides whether to release the first resource and/or decides whether to stop the data transmission of the first service may include the second network node. Correspondingly, the first network node may request the second network node to stop the data transmission of the first service, after receiving the first data, the second network node may decide whether to stop the data transmission of the first service, and may stop the transmission of the first service after it is determined to stop the data transmission of the first service.

Optionally, the first resource includes resources used for the first service between the first network node and the second network node.

Optionally, the first service may be a multicast service.

Optionally, the "first data" may be at least one of the following:
The first data is a packet (Package Data) sent on the user plane; for example, the first network node is a base station, and the second network node is an MB-UPF; for example, the first network node is a UPF, and the second network node is an MB-UPF. The message, such as end markers, carries specific formats and specific IEs or the like.

Optionally, this embodiment of the present application provides a trigger condition for the base station/core network function to send a resource release and/or stop sending a data indication to the core network function, so as to avoid wasting resources when no terminal receives the multicast service.

Optionally, the entity for determining to release resources and/or stop sending data is diversified, and may be a first network node, a second network node, or a third network node.

Optionally, when the first network node, such as the base station, finds that no UE is receiving the multicast service, it can indicate the second network node, such as the core network, to release the N2 resource and/or stop sending the multicast service, thereby improving resource utilization.

In this embodiment of the application, the first network node actively releases the first resource used for the first service between the first network node and the second network node, or instructs or requests the second node to release the first resource used for the first service, or instructs or requests the second node to stop the data transmission of the first service, which can avoid waste of resources caused when the sender sends multicast data normally, but no receiver receives the multicast service, and improve resource utilization.

Optionally, the first condition includes at least one of the following:
no terminal is interested in the first service;
no terminal receives the first service;
a service attribute of the first service includes a delay-insensitive characteristic;
the first service is in an inactive state;
no data of the first service has been received;
a timer expires; or an Internet Protocol (IP) transport layer uses a unicast transmission mode to transmit data.

Optionally, the first network node may determine that when no terminal is interested in the first service, the first condition is met.

Optionally, the first network node may determine that when no terminal receives the first service, the first condition is met.

Optionally, the first network node may determine that when a service attribute of the first service includes a delay-insensitive characteristic, the first condition is met.

Optionally, when determining that the first service is in an inactive state (for example, the Established multicast session is in an inactive state), the first network node may determine that the first condition is met.

Optionally, when determining that the data of the first service has not been received (for example, if the first network node has not received the data of the first service within a certain period of time, the first network node may consider that the data of the first service may be no longer sent subsequently), the first network node may determine that the first condition is met.

Optionally, when determining that the timer expires, the first network node may determine that the first condition is met. Optionally, when determining that the IP transport layer uses a unicast transmission mode to transmit data, the first network node may determine that the first condition is met.

Optionally, when any one or any combination of the above is met, the first network node may determine that the first condition is met.

Optionally, the first network node may set a timer (timer A) after determining at least one of the following items, and set a timing target time period, such as 20 ms.

no terminal is interested in the first service;
no terminal receives the first service;
a service attribute of the first service includes a delay-insensitive characteristic;
the first service is in an inactive state;
no data of the first service has been received; or
an IP transport layer uses a unicast transmission mode to transmit data;

Subsequently, after the timer A expire, the first network node may determine any one of the above items and there is no improvement within the target time period, and then determine that the first condition is met.

Optionally, the first network node may also directly set a timer B and set a timing target time period, such as 100 ms, and after the timer B expires, the first network node may determine that the first condition is met. Optionally, the IP transport layer uses the unicast transmission mode to transmit data, including at least one of the following:

the first network node receives unicast address information sent by a core network; or
the first network node receives multicast address information sent by the core network.

Optionally, when determining that the unicast address information sent by the core network is received, the first network node may determine that the IP transport layer uses the unicast transmission mode to transmit data.

Optionally, when determining that the multicast address information sent by the core network is received, the first network node may determine that the IP transport layer uses the unicast transmission mode to transmit data.

Optionally, the target address of the first data is determined based on the unicast address information.

Optionally, after receiving the unicast address information sent by the core network, the first network node may determine the target address of the first data based on the unicast address, and send the first data based on the target address.

Optionally, the first data includes the multicast address information.

Optionally, when the first network node transmits the first data, the first data may include multicast address information.

Optionally, the first data includes packet data sent through a user plane.

Optionally, the instruction to release resources and/or stop sending data may be transmitted in a user plane data packet.

Optionally, the first data may be a message sent through the user plane, for example, an end marker, such as a message carrying a specific format and a specific IE.

In this embodiment of the application, the first network node actively releases the first resource used for the first service between the first network node and the second network node, or instructs or requests the second node to release the first resource used for the first service, or instructs or requests the second node to stop the data transmission of the first service, which can avoid waste of resources caused when the sender sends multicast data normally, but no receiver receives the multicast service, and improve resource utilization.

Figure 3:
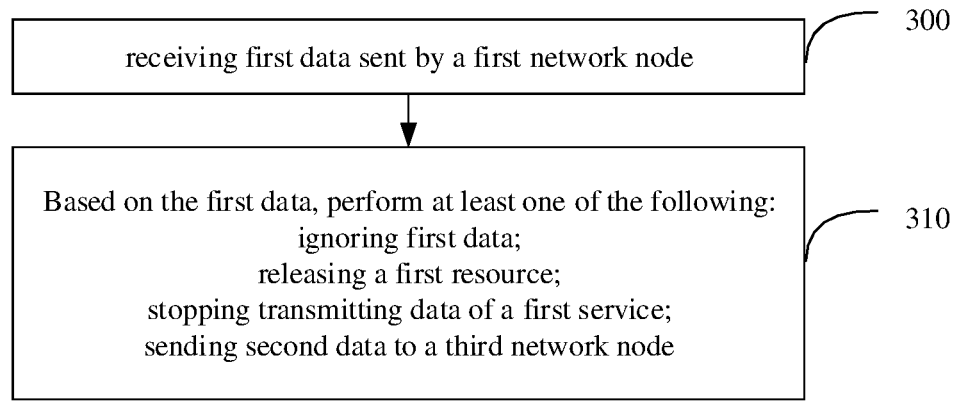
FIG. 3 is a second schematic flowchart of a resource release method according to the embodiment of the present application.

FIG. 3 is a second flowchart of a resource release method according to the embodiment of the present application. As shown in FIG. 3, the method is executed by a second network node, and the method includes the following steps:

Step 300: Receive first data sent by a first network node.
Step 310: Based on the first data, perform at least one of the following:
ignoring the first data;
releasing a first resource;
stopping transmitting data of the first service; or
sending second data to a third network node;
where the second data is used for at least one of the following:
requesting release of the first resource;
instructing the first resource to be released;
requesting to stop data transmission of the first service; or
indicating that data transmission of the first service is stopped;
where the first resource includes resources used for the first service between the first network node and the second network node.

In a communication system, for multicast services, only UEs in an RRC-CONNECTED state may receive multicast services, and the base station can strictly know the number of RRC-CONNECTED UEs that is receiving multicast data.

However, when a base station finds that no UE is receiving the multicast service, the base station can instruct the core network to release an N3 resource and/or directly stop sending the multicast service, thereby improving resource utilization.

The embodiment of the present application provides a process and method for instructing the core network to release the N3 resource and/or stop sending the multicast service when the base station finds that no UE is receiving the multicast service.

Optionally, the second network node may be a core network function, such as MB-UPF.

Optionally, the first network node determining that the first condition is met may be: the first network node determines that the first service is not received by the receiver after being sent; for example, no terminal receives the first service.

Optionally, the decision maker that decides whether to release the first resource and/or decides whether to stop the data transmission of the first service may include the first network node. Correspondingly, the first network node may directly release the first resource when it is determined that the first condition is met, and may also instruct the second network node to release the first resource. It should be noted that in this case, the decision of the first network node instructs the second network node is actually instructing (notifying) the second network node that the first resource has been released. After receiving the first data, the second network node can know that the first resource has been released.

Optionally, the decision maker that decides whether to release the first resource and/or decides whether to stop the data transmission of the first service may include the first network node. Correspondingly, when it is determined that the first condition is met, the first network node may determine to stop the data transmission of the first service, and instruct, through the first data, the second network node to stop the data transmission of the first service.

Optionally, the decision maker that decides whether to release the first resource and/or decides whether to stop the data transmission of the first service may include the second network node. Correspondingly, the first network node may request the second network node to release the first resource. After receiving the first data, the second network node may decide whether to release the first resource, and may release the first resource after it is determined to release the first resource.

Optionally, the decision maker that decides whether to release the first resource and/or decides whether to stop the data transmission of the first service may include the second network node. Correspondingly, the first network node may request the second network node to stop the data transmission of the first service, after receiving the first data, the second network node may decide whether to stop the data transmission of the first service, and may stop the transmission of the first service after it is determined to stop the data transmission of the first service.

Optionally, after releasing the first resource, the second network node may indicate (notify) the third network node that the first resource is released.

Optionally, after the second network node stops the data transmission of the first service, it may indicate (notify) the third network node that the data transmission of the first service is stopped.

Optionally, the decision maker that decides whether to release the first resource and/or decides whether to stop the data transmission of the first service may include a third network node. Correspondingly, after receiving the first data, the second network node may send the second data to the third network node, and request the third network node to release the first resource.

Optionally, the decision maker that decides whether to release the first resource and/or decides whether to stop the data transmission of the first service may include a third network node. Correspondingly, after receiving the first data, the second network node may send the second data to the third network node, and request the third network node to stop the data transmission of the first service.

Therefore, after the first network node sends the first data to the second network node, the method may further include at least one of the following items:

the second network node sends second data to the third network node, where the second data is used for requesting or indicating to release resources used for the first service between the first network node and the second network node and/or requesting the second network node to stop sending sends data of the first service to the first network node;

the second network node releases resources used for the first service between the first network node and the second network node;

the second network node stops sending data of the first service to the first network node; or the second network node ignores the first data.

Optionally, the first resource includes resources used for the first service between the first network node and the second network node.

Optionally, the first service may be a multicast service.

Optionally, this embodiment of the present application provides a trigger condition for the base station/core network function to send a resource release and/or stop sending a data indication to the core network function, so as to avoid wasting resources when no terminal receives the multicast service.

Optionally, the entity for determining to release resources and/or stop sending data is diversified, and may be a first network node, a second network node, or a third network node.

Optionally, when the first network node, such as the base station, finds that no UE is receiving the multicast service, it can indicate the second network node, such as the core network, to release the N2 resource and/or stop sending the multicast service, thereby improving resource utilization.

In this embodiment of the application, the first network node actively releases the first resource used for the first service between the first network node and the second network node, or instructs or requests the second node to release the first resource used for the first service, or instructs or requests the second node to stop the data transmission of the first service, which can avoid waste of resources caused when the sender sends multicast data normally, but no receiver receives the multicast service, and improve resource utilization.

Optionally, after sending the second data to the third network node, the method further includes:
receiving third data sent by the third network node; and
based on the third data, performing at least one of the following:
determining whether to release the first resource; or
determining whether to stop data transmission of the first service.

Optionally, after sending the second data to the third network node, the third data sent by the third network node may be received, and in this case, the decision maker that decides whether to release the first resource and/or whether to stop the data transmission of the first service may be a third network node.

Therefore, optionally, based on the third data, the second data may determine whether to release the first resource.

Optionally, based on the third data, the second data may determine whether to stop the data transmission of the first service.

Optionally, after the second network node sends the second data to the third network node, the third network node may send the third data to the second network node.

For example, when the first service is an MBS service, the third data may include a forwarding rule.

Optionally, the "third data" may include at least one of the following:

It is related to the second data; for example, the third network node can update the third data according to the content of the second data, and the updated third data must make the second network node no longer forward the data of the first service to the first network node, and/or instruct the second network node to release the resource used for the first service between the first network node and the second network node; correspondingly, in this case, the decision maker that decides whether to release the first resource and/or decides whether to stop data transmission of the first service may include a third network node.

It is not related to the second data; for example, the third network node can update the third data not according to the content of the second data, and the updated third data may not make the second network node no longer forward the data of the first service to the first network node, and/or may not instruct the second network node to release the resource used for the first service between the first network node and the second network node; correspondingly, in this case, the decision maker that decides whether to release the first resource and/or decides whether to stop data transmission of the first service may not include a third network node.

After the third network node sends the third data to the second network node, the method may further include at least one of the following:
 the second network node may determine, according to the content of the third data, whether to release resources used for the first service between the first network node and the second network node; or
 the second network node determines, according to the content of the third data, whether to stop sending the data of the first service to the first network node.

Optionally, after sending the second data to the third network node, the method further includes:
 receiving third data sent by the third network node; and
 based on the third data and the first data, performing at least one of the following:
 determining whether to release the first resource; or
 determining whether to stop data transmission of the first service.

Optionally, the decision maker who decides whether to release the first resource and/or decides whether to stop the data transmission of the first service may include a second network node, and after comprehensively referring to the first data and the third data, the second network node may decide whether to release the resources and/or decide whether to stop the data transmission of the first service.

Optionally, according to the content of the first data and the content of the third data, the second network node may comprehensively determine whether to release resources used for the first service between the first network node and the second network node.

Optionally, the second network node may release the first resource only if both the content of the first data and the third data requests to release the first resource.

Optionally, the second network node may release the first resource as long as either of the content of the first data or the third data requests to release the first resource.

Optionally, according to the content of the first data and the content of the third data, the second network node may comprehensively determine whether to stop sending the data of the first service to the first network node.

Optionally, the second network node stops sending data only when both the contents of the first data and the third data request to stop the data transmission of the first service.

Optionally, as long as the content of the first data or the third data requests to stop the data transmission of the first service, the second network node stops sending the data.

In this embodiment of the application, the first network node actively releases the first resource used for the first service between the first network node and the second network node, or instructs or requests the second node to release the first resource used for the first service, or instructs or requests the second node to stop the data transmission of the first service, which can avoid waste of resources caused when the sender sends multicast data normally, but no receiver receives the multicast service, and improve resource utilization.

Figure 4:
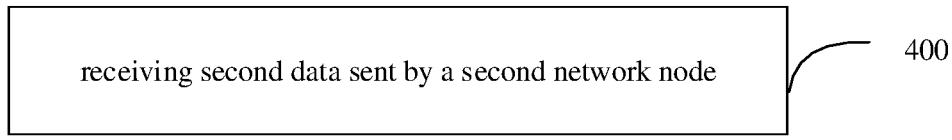
FIG. 4 is a third schematic flowchart of a resource release method according to the embodiment of the present application.

FIG. 4 is a third flowchart of a resource release method according to the embodiment of the present application. As shown in FIG. 4, the method is executed by a third network node, and the method includes the following steps:

Step 400: Receive second data sent by a second network node.

In a communication system, for multicast services, only UEs in an RRC-CONNECTED state may receive multicast services, and the base station can strictly know the number of RRC-CONNECTED UEs that is receiving multicast data.

However, when a base station finds that no UE is receiving the multicast service, the base station can instruct the core network to release an N3 resource and/or directly stop sending the multicast service, thereby improving resource utilization.

The embodiment of the present application provides a process and method for instructing the core network to release the N3 resource and/or stop sending the multicast service when the base station finds that no UE is receiving the multicast service.

Optionally, the third network node may be a core network function, such as MB-SMF.

Optionally, the first network node determining that the first condition is met may be: the first network node determines that the first service is not received by the receiver after being sent; for example, no terminal receives the first service.

Optionally, the decision maker that decides whether to release the first resource and/or decides whether to stop the data transmission of the first service may include the first network node, and accordingly, when determining that the first condition is met, the first network node may determine that the data transmission of the first service needs to be stopped, and instruct the second network node to stop the data transmission of the first service through the first data. After receiving the first data, the second network node can directly stop the data transmission of the first service, or notify, through the second data, the third network node that the data transmission of the first service is stopped, and after receiving the second data, the third network node can determine that the data transmission of the first service is stopped.

Optionally, the decision maker that decides whether to release the first resource and/or decides whether to stop the data transmission of the first service may include the second network node. Correspondingly, the first network node may request the second network node to release the first resource. After receiving the first data, the second network node may decide whether to release the first resource, and may release the first resource after it is determined to release the first resource, or notify, through the second data, the third network node that the first resource is released, and after receiving the second data, the third network node can determine that the first resource is released.

Optionally, the decision maker that decides whether to release the first resource and/or decides whether to stop the data transmission of the first service may include the second network node. Correspondingly, the first network node may request the second network node to stop the data transmission of the first service, after receiving the first data, the second network node may decide whether to stop the data transmission of the first service, and may stop the transmission of the first service after it is determined to stop the data transmission of the first service, or notify, through the second data, the third network node that the data transmission of the first service is stopped, and after receiving the second data, the third network node can determine that the data transmission of the first service is stopped.

Optionally, after releasing the first resource, the second network node may indicate (notify) the third network node that the first resource is released; after receiving the second data, the third network node may determine that the first resource is released.

Optionally, after the second network node stops the data transmission of the first service, it may instruct (notify) the third network node that the data transmission of the first service is stopped; after receiving the second data, the third network node may determine that the data of the first service is stopped.

Therefore, after the first network node sends the first data to the second network node, the method may further include at least one of the following items:
the second network node sends second data to the third network node, where the second data is used for requesting or indicating to release resources used for the first service between the first network node and the second network node and/or requesting the second network node to stop sending sends data of the first service to the first network node;
the second network node releases resources used for the first service between the first network node and the second network node;
the second network node stops sending data of the first service to the first network node; or
the second network node ignores the first data.

Optionally, the first resource includes resources used for the first service between the first network node and the second network node.

Optionally, the first service may be a multicast service.

Optionally, this embodiment of the present application provides a trigger condition for the base station/core network function to send a resource release and/or stop sending a data indication to the core network function, so as to avoid wasting resources when no terminal receives the multicast service.

Optionally, the entity for determining to release resources and/or stop sending data is diversified, and may be a first network node, a second network node, or a third network node.

Optionally, when the first network node, such as the base station, finds that no UE is receiving the multicast service, it can indicate the second network node, such as the core network, to release the N2 resource and/or stop sending the multicast service, thereby improving resource utilization.

In this embodiment of the application, the first network node actively releases the first resource used for the first service between the first network node and the second network node, or instructs or requests the second node to release the first resource used for the first service, or instructs or requests the second node to stop the data transmission of the first service, which can avoid waste of resources caused when the sender sends multicast data normally, but no receiver receives the multicast service, and improve resource utilization.

In this embodiment of the application, the first network node actively releases the first resource used for the first service between the first network node and the second network node, or instructs or requests the second node to release the first resource used for the first service, or instructs or requests the second node to stop the data transmission of the first service, which can avoid waste of resources caused when the sender sends multicast data normally, but no receiver receives the multicast service, and improve resource utilization.

Optionally, the method further includes:
sending third data to the second network node after receiving the second data, where the third data is used for at least one of the following:
instructing the second network node whether to release the first resource;
advising the second network node whether to release the first resource;
instructing the second network node whether to stop data transmission of the first service; or
advising the second network node whether to stop data transmission of the first service.

Optionally, the decision maker that decides whether to release the first resource and/or decides whether to stop the data transmission of the first service may include a third network node. Correspondingly, after receiving the first data, the second network node may send the second data to the third network node, and request the third network node to release the first resource; after receiving the second data, the third network node may send the third data to the second network node if it determines that the first resource can be released, to indicate the second network node to release the first resource.

Optionally, the decision maker that decides whether to release the first resource and/or decides whether to stop the data transmission of the first service may include a third network node. Correspondingly, after receiving the first data, the second network node may send the second data to the third network node, and request the third network node to release the first resource; after receiving the second data, the third network node may send the third data to the second network node if it determines that the first resource cannot be released, to indicate the second network node not to release the first resource.

Optionally, the decision maker that decides whether to release the first resource and/or decides whether to stop the data transmission of the first service may include the second network node, and correspondingly, after the second network node receives the first data, it may send the second data to the third network node, and request the third network node to release the first resource; after receiving the second data, the third network node may send the third data to the second network node if it determines that the first resource can be released, to advise the second network node to release the first resource.

Optionally, the decision maker that decides whether to release the first resource and/or decides whether to stop the data transmission of the first service may include the second network node, and correspondingly, after the second network node receives the first data, it may send the second data to the third network node, and request the third network node to release the first resource; after receiving the second data, the third network node may send the third data to the second network node if it determines that the first resource cannot be released, to advise the second network node not to release the first resource.

Optionally, based on the third data and/or the first data, the second network node may finally determine whether to release the first resource.

Optionally, the decision maker that decides whether to release the first resource and/or decides whether to stop the data transmission of the first service may include a third network node. Correspondingly, after receiving the first data, the second network node may send the second data to the third network node, and request the third network node to stop the data transmission of the first service.

Optionally, the decision maker that decides whether to release the first resource and/or decides whether to stop the data transmission of the first service may include the third network node, and correspondingly, after the second network node receives the first data, it may send the second data to the third network node, and request the third network node to stop the data transmission of the first service. After the third network node receives the second data, if it is determined that the data transmission of the first service can be stopped, it can send the third data to the second network node to indicate the second network node to stop the data transmission of the first service.

Optionally, the decision maker that decides whether to release the first resource and/or decides whether to stop the data transmission of the first service may include a third network node. Correspondingly, after receiving the first data, the second network node may send the second data to the third network node, and request the third network node to stop the data transmission of the first service; after the third network node receives the second data, if it is determined that the data transmission of the first service cannot be stopped, it can send third data to the second network node to indicate the second network node not to stop the data transmission of the first service.

Optionally, the decision maker that decides whether to release the first resource and/or decides whether to stop the data transmission of the first service may include the second network node, and correspondingly, after the second network node receives the first data, it may send the second data to the third network node, and request the third network node to stop the data transmission of the first service; after the third network node receives the second data, if it determines that the data transmission of the first service can be stopped, it can send third data to the second network node, to advise the second network node to stop the data transmission of the first service.

Optionally, the decision maker that decides whether to release the first resource and/or decides whether to stop the data transmission of the first service may include the second network node, and correspondingly, after the second network node receives the first data, it may send the second data to the third network node, and request the third network node to stop the data transmission of the first service. After the third network node receives the second data, if it is determined that the data transmission of the first service cannot be stopped, it can send the third data to the second network node to advise the second network node not to stop the data transmission of the first service.

Optionally, based on the third data and/or the first data, the second network node may finally determine whether to stop data transmission of the first service.

After "the second network node sends the second data to the third network node", it may also be that the third network node sends the third data to the second network node (for example, when the first service is an MBS service, the third data includes a forwarding rule).

Optionally, the "third data" may include at least one of the following:

It is related to the second data; for example, the third network node can update the third data according to the content of the second data, and the updated third data must make the second network node no longer forward the data of the first service to the first network node, and/or instruct the second network node to release the resource used for the first service between the first network node and the second network node; correspondingly, in this case, the decision maker that decides whether to release the first resource and/or decides whether to stop data transmission of the first service may include a third network node.

It is not related to the second data; for example, the third network node can update the third data not according to the content of the second data, and the updated third data may not make the second network node no longer forward the data of the first service to the first network node, and/or may not instruct the second network node to release the resource used for the first service between the first network node and the second network node; correspondingly, in this case, the decision maker that decides whether to release the first resource and/or decides whether to stop data transmission of the first service may not include a third network node.

After the third network node sends the third data to the second network node, the method may further include at least one of the following:

the second network node may determine, according to the content of the third data, whether to release resources used for the first service between the first network node and the second network node; or the second network node determines, according to the content of the third data, whether to stop sending the data of the first service to the first network node.

Optionally, according to the content of the first data and the content of the third data, the second network node may comprehensively determine whether to release resources used for the first service between the first network node and the second network node.

Optionally, the second network node may release the first resource only if both the content of the first data and the third data requests to release the first resource.

Optionally, the second network node may release the first resource as long as either of the content of the first data or the third data requests to release the first resource.

Optionally, according to the content of the first data and the content of the third data, the second network node may comprehensively determine whether to stop sending the data of the first service to the first network node.

Optionally, the second network node stops sending data only when both the contents of the first data and the third data request to stop the data transmission of the first service.

Optionally, as long as the content of the first data or the third data requests to stop the data transmission of the first service, the second network node stops sending the data.

In this embodiment of the application, the first network node actively releases the first resource used for the first service between the first network node and the second network node, or instructs or requests the second node to release the first resource used for the first service, or instructs or requests the second node to stop the data transmission of the first service, which can avoid waste of resources caused when the sender sends multicast data normally, but no receiver receives the multicast service, and improve resource utilization.

Figure 5:
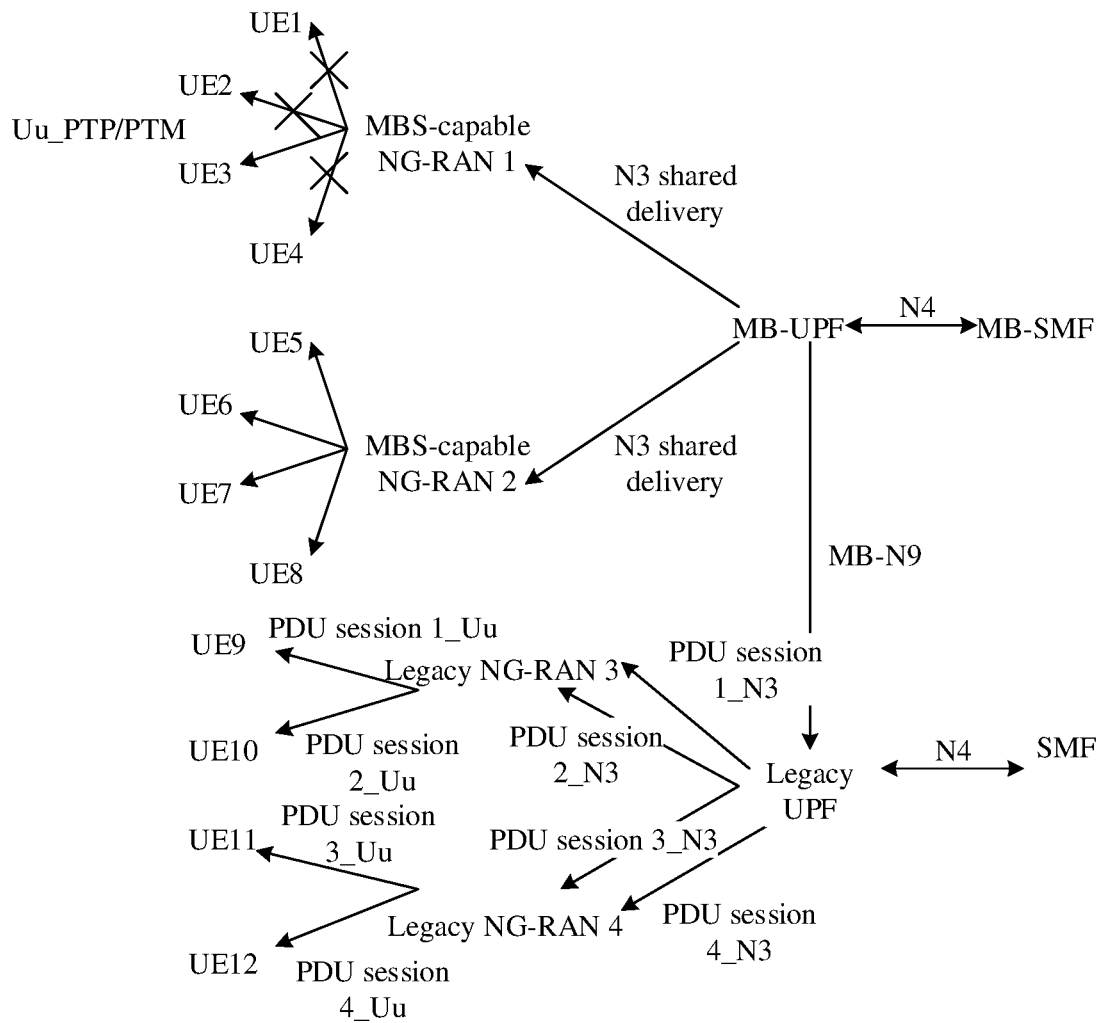
FIG. 5 is a first schematic diagram of a resource release method according to the embodiment of the present application.

FIG. 5 is a first schematic diagrams of a resource release method according to the embodiment of the present application. As shown in FIG. 5, the first network node may include an MBS-capable NG-RAN 1 or an enhanced base station NG-RAN1. This is not limited in the embodiment of the present application. The second network node may include an MB-UPF, and the third network node may include an MB-SMF. Then, the resource release method may include the following steps:

Step a1. After the MBS-capable NG-RAN 1 node determines that no terminal is interested in a delay-insensitive multicast session ID=x MBS service, it starts a timer.

Step b1. If no terminal is interested in the delay-insensitive multicast session ID=x MBS service before the timer expires, the MBS-capable NG-RAN 1 node sends first data to the MB-UPF through the N3 user plane, where the first data is used to request MB-UPF to release the shared delivery channel resource used for multicast session ID=x MBS service in N3 between MBS-capable NG-RAN 1 node and MB-UPF.

Step c1. MB-UPF receives the first data sent by MBS-capable NG-RAN 1 node, and sends second data to MB-SMF, where the second data is used to request to release the shared delivery channel resource used for multicast session ID=x MBS service in N3 between MBS-capable NG-RAN 1 node and MB-UPF.

Step d1. MB-SMF receives the second data sent by MB-UPF, and sends third data to MB-UPF, that is, an updated forwarding rule, where the updated forwarding rule no longer includes an address of MBS-capable NG-RAN 1.

Step e1. MB-UPF receives the third data sent by MB-SMF, and releases the shared delivery channel resource used for multicast session ID=x MBS service in N3 between MBS-capable NG-RAN 1 node and MB-UPF.

Figure 6:
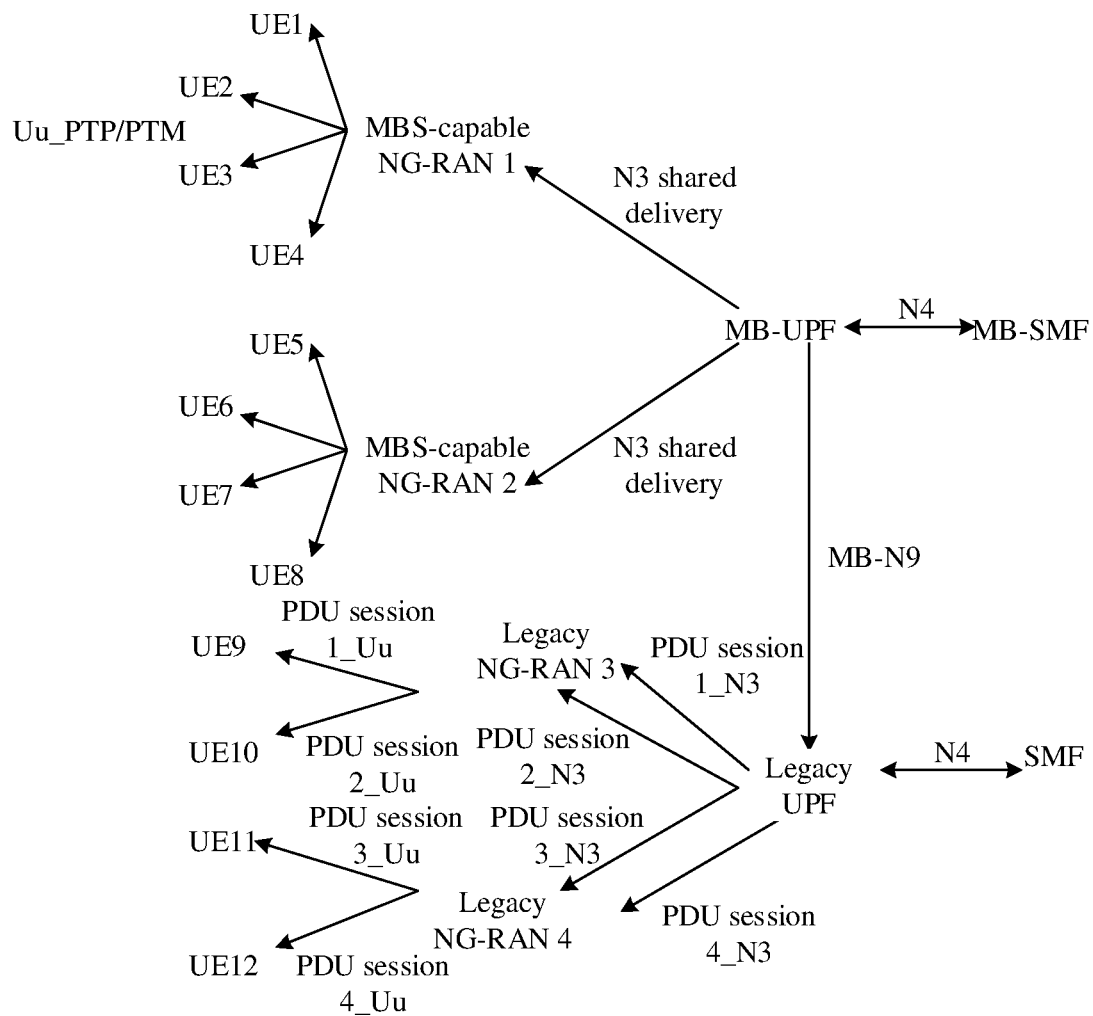
FIG. 6 is a second schematic diagram of a resource release method according to the embodiment of the present application.

FIG. 6 is a second schematic diagram of the resource release method according to the embodiment of the present application. As shown in FIG. 6, the first network node may include Legacy UPF, the second network node may include MB-UPF, and the third network node may include MB-UPF. SMF. Then, the resource release method may include the following steps:

Step a2. Legacy UPF determines that all PDU sessions no longer provide data of multicast session ID=x MBS services after being modified by SMF, but only provide unicast data of non-MBS services.

Step b2. Legacy UPF sends first data to MB-UPF through MB-N9 user plane, where the first data is used to request MB-UPF to release MB-N9 resources used for multicast session ID=x MBS services between Legacy UPF and MB-UPF.

Step c2. MB-UPF receives the first data sent by Legacy UPF, and sends second data to MB-SMF, where the second data is used to request the release of MB-N9 resources used for multicast session ID=x MBS services between Legacy UPF and MB-UPF.

Step d2. MB-SMF receives the second data sent by MB-UPF, and sends third data to MB-UPF, that is, an updated forwarding rule, where the updated forwarding rule no longer includes an address of Legacy UPF.

Step e2. After the MB-UPF receives the third data sent by the MB-SMF, it releases MB-N9 resources used for the multicast session ID=x MBS service between the Legacy UPF and the MB-UPF.

In this embodiment of the application, the first network node actively releases the first resource used for the first service between the first network node and the second network node, or instructs or requests the second node to release the first resource used for the first service, or instructs or requests the second node to stop the data transmission of the first service, which can avoid waste of resources caused when the sender sends multicast data normally, but no receiver receives the multicast service, and improve resource utilization.

It should be noted that, the resource release method provided in the embodiment of the present application may be executed by a resource release apparatus, or a control module in the resource release apparatus for executing the resource release method. In the embodiment of the present application, the resource releasing apparatus provided in the embodiment of the present application is described by taking the resource releasing apparatus executing the resource releasing method as an example.

Figure 7:
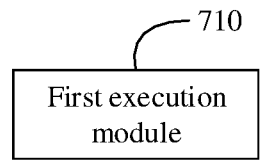
FIG. 7 is a first structural schematic diagram of a resource release apparatus according to the embodiment of the present application.

FIG. 7 is a first structural schematic diagrams of a resource release apparatus according to the embodiment of the present application. As shown in FIG. 7, the apparatus includes: a first execution module 710.

The first execution module 710 is configured to: in a case that it is determined that a first condition is met, perform at least one of the following:

releasing a first resource; or sending first data to a second network node;

where the first data is used for at least one of the following:

requesting the second network node to release the first resource;

indicating the second network node to release the first resource;

requesting the second network node to stop data transmission of a first service; or indicating the second network node to stop data transmission of the first service;

where the first resource includes resources used for the first service between the first network node and the second network node.

Optionally, the resource releasing apparatus may release the first resource and/or send the first data to the second network node in a case that the first execution module 710 determines that the first condition is met.

In this embodiment of the application, the first network node actively releases the first resource used for the first service between the first network node and the second network node, or instructs or requests the second node to release the first resource used for the first service, or instructs or requests the second node to stop the data transmission of the first service, which can avoid waste of resources caused when the sender sends multicast data normally, but no receiver receives the multicast service, and improve resource utilization.

Optionally, the first condition includes at least one of the following:

no terminal is interested in the first service;

no terminal receives the first service;

a service attribute of the first service includes a delay-insensitive characteristic;

the first service is in an inactive state;

no data of the first service has been received;

a timer expires; or an IP transport layer uses a unicast transmission mode to transmit data.

Optionally, the IP transport layer uses the unicast transmission mode to transmit data, including at least one of the following:

the first network node receives unicast address information sent by a core network; or the first network node receives the multicast address information sent by the core network.

Optionally, the target address of the first data is determined based on the unicast address information.

Optionally, the first data includes the multicast address information.

Optionally, the first data includes packet data sent through a user plane.

In this embodiment of the application, the first network node actively releases the first resource used for the first service between the first network node and the second network node, or instructs or requests the second node to release the first resource used for the first service, or instructs or requests the second node to stop the data transmission of the first service, which can avoid waste of resources caused when the sender sends multicast data normally, but no receiver receives the multicast service, and improve resource utilization.

The resource release apparatus in the embodiment of the present application may be a device, a device with an operating system or an electronic device, or a component, an integrated circuit, or a chip in a terminal. The apparatus or the electronic device may be a mobile terminal, or a non-mobile terminal. For example, the mobile device may include but is not limited to the types of the terminal 11 listed above, and the non-mobile terminal may be a server, a network attached storage (NAS), a personal computer (PC), a television (TV), an automated teller machine, or a self-service machine. This is not specifically limited in the embodiments of this application.

The resource release apparatus according to an embodiments of the present disclosure can implement the processes in the method embodiments in FIG. 2, and achieve the same technical effect. To avoid repetition, details are not described herein again.

Figure 8:
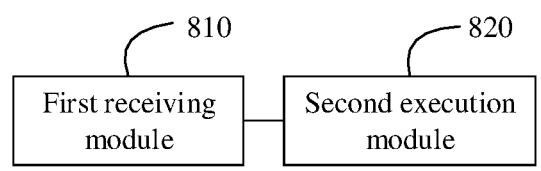
FIG. 8 is a second structural schematic diagram of a resource release apparatus according to the embodiment of the present application.

FIG. 8 is a second structural diagram of the resource release apparatus according to the embodiment of the present application. As shown in FIG. 8, the apparatus includes: a first receiving module 810 and a second execution module 820.

The first receiving module 810 is configured to receive the first data sent by the first network node.

The second execution module 820 is configured to: based on the first data, perform at least one of the following:
  ignoring the first data;
  releasing a first resource;
  stopping transmitting data of the first service; or
  sending second data to a third network node;
  where the second data is used for at least one of the following:
  requesting release of the first resource;
  instructing the first resource to be released;
  requesting to stop data transmission of the first service; or
  indicating that data transmission of the first service is stopped;
  where the first resource includes resources used for the first service between the first network node and the second network node.

Optionally, the resource releasing apparatus may receive, through the first receiving module 810, the first data sent by the first network node; and then perform at least one of the following based on the first data through the second execution module 820: ignoring the first data; releasing the first resource; stopping data transmission of the first service; or sending the second data to the third network node.

In this embodiment of the application, the first network node actively releases the first resource used for the first service between the first network node and the second network node, or instructs or requests the second node to release the first resource used for the first service, or instructs or requests the second node to stop the data transmission of the first service, which can avoid waste of resources caused when the sender sends multicast data normally, but no receiver receives the multicast service, and improve resource utilization.

Optionally, the apparatus further includes a second receiving module and a third execution module, after sending the second data to the third network node,
  the second receiving module is configured to receive third data sent by a third network node; and
  the third execution module is configured to: based on the third data, execute at least one of the following:
  determining whether to release the first resource; or
  determining whether to stop data transmission of the first service.

Optionally, after sending the second data to the third network node, the apparatus further includes:
  a third receiving module, configured to receive third data sent by a third network node; and
  based on the third data and the first data, the third execution module performs at least one of the following:
  determining whether to release the first resource; or
  determining whether to stop data transmission of the first service.

In this embodiment of the application, the first network node actively releases the first resource used for the first service between the first network node and the second network node, or instructs or requests the second node to release the first resource used for the first service, or instructs or requests the second node to stop the data transmission of the first service, which can avoid waste of resources caused when the sender sends multicast data normally, but no receiver receives the multicast service, and improve resource utilization.

The resource release apparatus in the embodiment of the present application may be a device, a device with an operating system or an electronic device, or a component, an integrated circuit, or a chip in a terminal. The apparatus or the electronic device may be a mobile terminal, or a non-mobile terminal. For example, the mobile device may include but is not limited to the types of the terminal 11 listed above, and the non-mobile terminal may be a server, a network attached storage (NAS), a personal computer (PC), a television (TV), an automated teller machine, or a self-service machine. This is not specifically limited in the embodiments of this application.

The resource release apparatus according to an embodiments of the present disclosure can implement the processes in the method embodiments in FIG. 3, and achieve the same technical effect. To avoid repetition, details are not described herein again.

Figure 9:
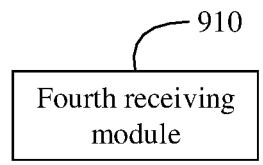
FIG. 9 is a third structural schematic diagram of a resource release apparatus according to the embodiment of the present application.

FIG. 9 is a third structural schematic diagram of the resource release apparatus according to the embodiment of the present application. As shown in FIG. 9, the apparatus includes: a fourth receiving module 910.

The fourth receiving module 910 is configured to receive second data sent by the second network node.

Optionally, the resource releasing apparatus may receive, through the fourth receiving module 910, the second data sent by the second network node.

In this embodiment of the application, the first network node actively releases the first resource used for the first service between the first network node and the second network node, or instructs or requests the second node to release the first resource used for the first service, or instructs or requests the second node to stop the data transmission of the first service, which can avoid waste of resources caused when the sender sends multicast data normally, but no receiver receives the multicast service, and improve resource utilization.

Optionally, the apparatus further includes:
a first sending module, configured to send third data to the second network node after receiving the second data, where the third data is used for at least one of the following:
instructing the second network node whether to release the first resource;
advising the second network node whether to release the first resource;
instructing the second network node whether to stop data transmission of the first service; or
advising the second network node whether to stop data transmission of the first service.

In this embodiment of the application, the first network node actively releases the first resource used for the first service between the first network node and the second network node, or instructs or requests the second node to release the first resource used for the first service, or instructs or requests the second node to stop the data transmission of the first service, which can avoid waste of resources caused when the sender sends multicast data normally, but no receiver receives the multicast service, and improve resource utilization.

The resource release apparatus in the embodiment of the present application may be a device, a device with an operating system or an electronic device, or a component, an integrated circuit, or a chip in a terminal. The apparatus or the electronic device may be a mobile terminal, or a non-mobile terminal. For example, the mobile device may include but is not limited to the types of the terminal 11 listed above, and the non-mobile terminal may be a server, a network attached storage (NAS), a personal computer (PC), a television (TV), an automated teller machine, or a self-service machine. This is not specifically limited in the embodiments of this application.

The resource release apparatus in the embodiments of the present application may be an apparatus with an operating system. The operating system may be an Android operating system, may be an iOS operating system, or may be another possible operating system. This is not specifically limited in this embodiment of this application.

The resource release apparatus according to an embodiments of the present disclosure can implement the processes in the method embodiments in FIG. 4, and achieve the same technical effect. To avoid repetition, details are not described herein again.

Figure 10:
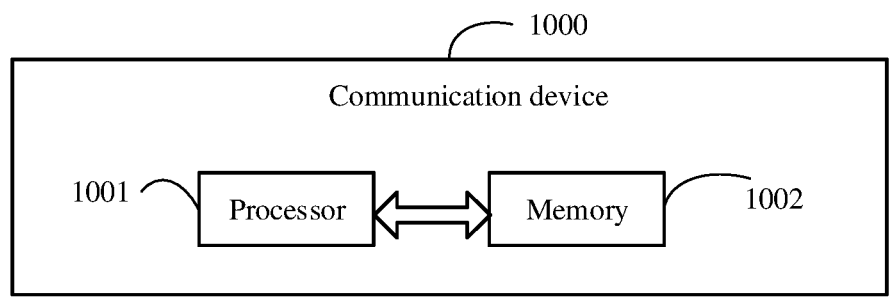
FIG. 10 is a schematic structural diagram of a communications device according to an embodiment of this application.

Optionally, FIG. 10 is a schematic structural diagram of a communication device according to the embodiment of the present application. As shown in FIG. 10, the embodiment of the present application also provides a communication device 1000, including a processor 1001, a memory 1002, and a program or instruction stored in the memory 1002 and operable on the processor 1001. For example, when the communication device 1000 is a terminal, the program or instruction is executed by the processor 1001 to implement the various processes of the above resource release method, and can achieve the same technical effect. When the communication device 1000 is a network side device, when the programs or instructions are executed by the processor 1001, each process of the above embodiment of the resource release method is performed, and the same technical effect can be achieved. To avoid repetition, details are not repeated herein.

The embodiment of the present application also provides a network node, including a processor and a communication interface, and the processor is configured to:
in a case that it is determined that a first condition is met, perform at least one of the following:
releasing a first resource; or
sending first data to a second network node;
where the first data is used for at least one of the following:
requesting the second network node to release the first resource;
indicating the second network node to release the first resource;
requesting the second network node to stop data transmission of a first service; or
indicating the second network node to stop data transmission of the first service;
where the first resource includes resources used for the first service between the first network node and the second network node.

This embodiment of the network node corresponds to the embodiment of the resource release method, and each implementation process and implementation mode of the method embodiment can be applied to this embodiment of the network node, and can achieve the same technical effect.

Figure 11:
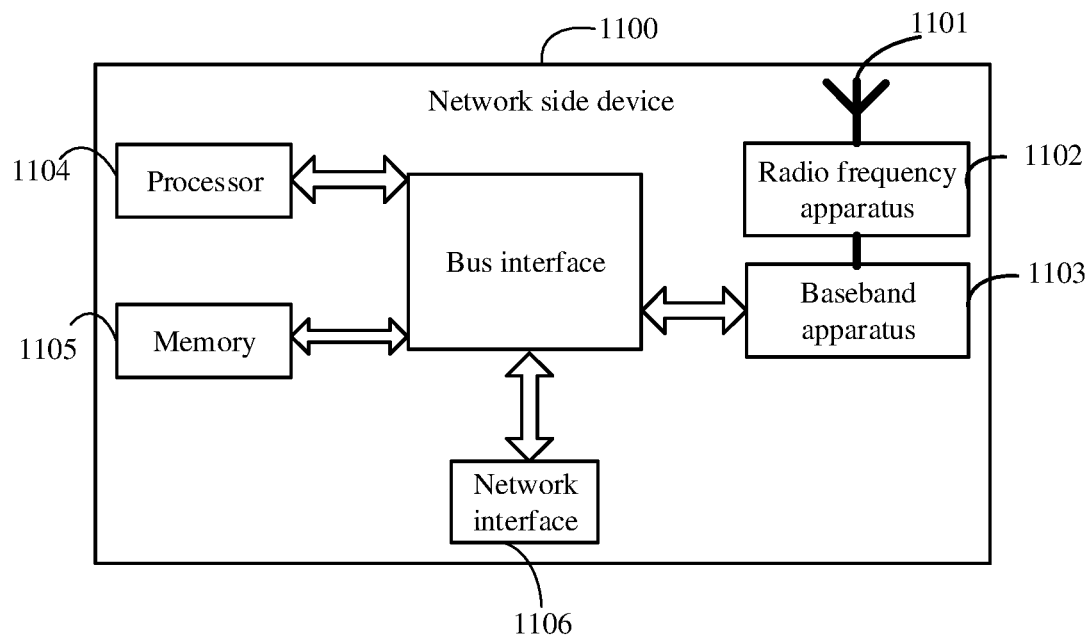
FIG. 11 is a first schematic structural diagram of a network node according to an embodiment of the present application.

Optionally, the embodiment of the present application also provides a network node. FIG. 11 is a first schematic structural diagram of a network node according to the embodiment of the present application. As shown in FIG. 11, the network device 1100 includes: an antenna 1101, a radio frequency device 1102, and a baseband device 1103. The antenna 1101 is connected to the radio frequency apparatus 1102. In an uplink direction, the radio frequency apparatus 1102 receives information by using the antenna 1101, and sends the received information to the baseband apparatus 1103 for processing. In a downlink direction, the baseband apparatus 1103 processes information that needs to be sent, and sends processed information to the radio frequency apparatus 1102. The radio frequency apparatus 1102 processes the received information, and sends processed information by using the antenna 1101.

The foregoing band processing apparatus may be located in the baseband apparatus 1103, and the method performed through the network node in the foregoing embodiment may be implemented in the baseband apparatus 1103. The baseband apparatus 1103 includes a processor 1104 and a memory 1105.

The baseband apparatus 1103 may include, for example, at least one baseband board, where a plurality of chips are disposed on the baseband board. As shown in FIG. 11, one chip is, for example, the processor 1104, which is connected to the memory 1105, so as to invoke a program in the memory 1105 to perform operations of the network device shown in the foregoing method embodiment.

The baseband apparatus 1103 may further include a network interface 1106, configured to exchange information with the radio frequency apparatus 1102. For example, the interface is a common public radio interface (CPRI).

Optionally, the network node in this embodiment of the present application further includes: an instruction or a program stored on the memory 1105 and executable on the processor 1104, and the processor 1104 invokes the instruction or program in the memory 1105 to execute the method executed by each module shown in FIG. 7, and achieve the same technical effect. To avoid repetition, details are not described herein again.

The processor 1110 is configured to:
in a case that it is determined that a first condition is met, perform at least one of the following:
releasing a first resource; or
sending first data to a second network node;
where the first data is used for at least one of the following:
requesting the second network node to release the first resource;
indicating the second network node to release the first resource;
requesting the second network node to stop data transmission of a first service; or
indicating the second network node to stop data transmission of the first service;
where the first resource includes resources used for the first service between the first network node and the second network node.

In this embodiment of the application, the first network node actively releases the first resource used for the first service between the first network node and the second network node, or instructs or requests the second node to release the first resource used for the first service, or instructs or requests the second node to stop the data transmission of the first service, which can avoid waste of resources caused when the sender sends multicast data normally, but no receiver receives the multicast service, and improve resource utilization.

Optionally, the first condition includes at least one of the following:
no terminal is interested in the first service;
no terminal receives the first service;
a service attribute of the first service includes a delay-insensitive characteristic;
the first service is in an inactive state;
no data of the first service has been received;
a timer expires; or
an IP transport layer uses a unicast transmission mode to transmit data.

Optionally, the IP transport layer uses the unicast transmission mode to transmit data, including at least one of the following:
the first network node receives unicast address information sent by a core network; or
the first network node receives the multicast address information sent by the core network.

Optionally, the target address of the first data is determined based on the unicast address information.

Optionally, the first data includes the multicast address information.

Optionally, the first data includes packet data sent through a user plane.

In this embodiment of the application, the first network node actively releases the first resource used for the first service between the first network node and the second network node, or instructs or requests the second node to release the first resource used for the first service, or instructs or requests the second node to stop the data transmission of the first service, which can avoid waste of resources caused when the sender sends multicast data normally, but no receiver receives the multicast service, and improve resource utilization.

The embodiment of the present application also provides a network node, including a processor and a communication interface, where the communication interface is configured to:
receive first data sent by a first network node; and
the processor is configured to:
based on the first data, perform at least one of the following:
ignoring the first data;
releasing a first resource;
stopping transmitting data of the first service; or
sending second data to a third network node;
where the second data is used for at least one of the following:
requesting release of the first resource;
instructing the first resource to be released;
requesting to stop data transmission of the first service; or
indicating that data transmission of the first service is stopped;
where the first resource includes resources used for the first service between the first network node and the second network node.

This embodiment of the network node corresponds to the embodiment of the network node method, and each implementation process and implementation mode of the method embodiment can be applied to this embodiment of the network node, and can achieve the same technical effect.

Figure 12:
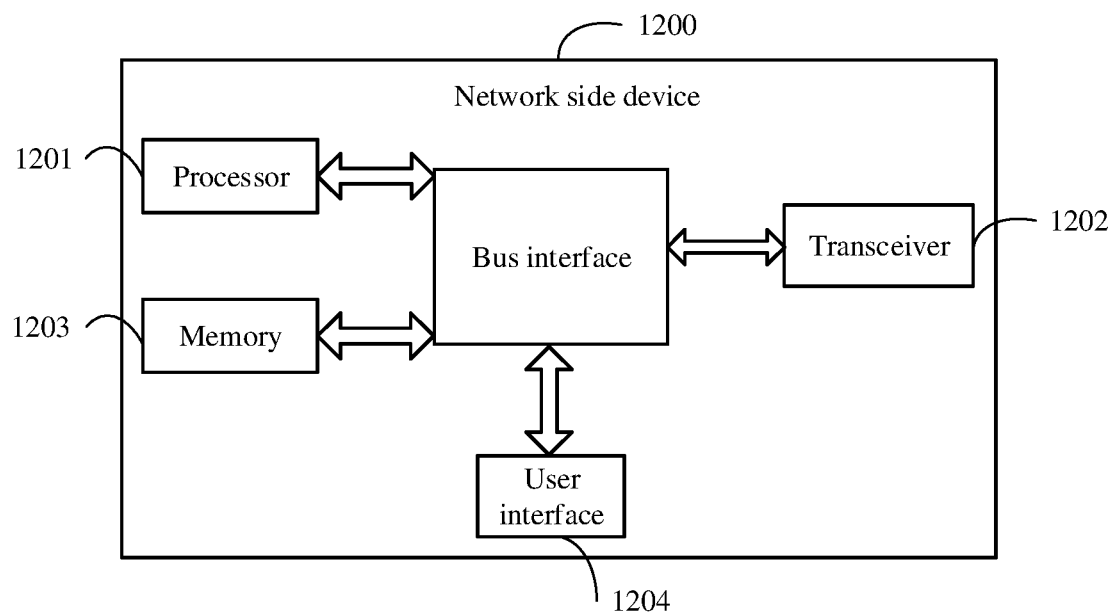
FIG. 12 is a second schematic structural diagram of a network node according to an embodiment of the present application.

Optionally, the embodiment of the present application also provides a network node. FIG. 12 is a second structural diagram of the network node according to the embodiment of the present application. As shown in FIG. 12, the network device 1200 includes: a processor 1201, a transceiver 1202, a memory 1203, a user interface 1204 and a bus interface.

In the embodiment of the present application, the network side device 1200 further includes: a computer program stored in the memory 1203 and operable on the processor 1201, the computer program is executed by the processor 1201, so that the method executed by each module shown in FIG. 8 is performed, and the same technical effect can be achieved. To avoid repetition, it is not repeated here.

In FIG. 12, a bus architecture may include any quantity of interconnected buses and bridges, and is linked by various circuits of one or more processors represented by the processor 1201 and a memory represented by the memory 1203. The bus architecture may further link various other circuits such as a peripheral device, a voltage regulator, and a power management circuit together. These are all well-known in the art, and therefore are not described in this specification. A bus interface provides an interface. The transceiver 1202 may be a plurality of components. To be specific, the transceiver includes a transmitter and a receiver, and provides a unit configured to communicate with various other apparatuses on a transmission medium. For different user equipment, the user interface 1204 may further be an interface that can be externally or internally connected to a required device. The connected device includes but is not limited to a keypad, a display, a loudspeaker, a microphone, a joystick, and the like.

The processor 1201 is responsible for managing the bus architecture and common processing, and the memory 1203 may store data used when the processor 1201 performs an operation.

The transceiver 1202 is configured to:
receive first data sent by a first network node; and
the processor 1201 is configured to:
based on the first data, perform at least one of the following:

ignoring the first data;
releasing a first resource;
stopping transmitting data of the first service; or
sending second data to a third network node;
where the second data is used for at least one of the following:
requesting release of the first resource;
instructing the first resource to be released;
requesting to stop data transmission of the first service; or
indicating that data transmission of the first service is stopped;
where the first resource includes resources used for the first service between the first network node and the second network node.

In this embodiment of the application, the first network node actively releases the first resource used for the first service between the first network node and the second network node, or instructs or requests the second node to release the first resource used for the first service, or instructs or requests the second node to stop the data transmission of the first service, which can avoid waste of resources caused when the sender sends multicast data normally, but no receiver receives the multicast service, and improve resource utilization.

Optionally, the processor 1201 is configured to:
after sending the second data to the third network node, receive third data sent by the third network node; and based on the third data, perform at least one of the following:
determining whether to release the first resource; or
determining whether to stop data transmission of the first service.

Optionally, the processor 1201 is configured to:
after sending the second data to the third network node, receive third data sent by the third network node; and based on the third data and the first data, perform at least one of the following:
determining whether to release the first resource; or
determining whether to stop data transmission of the first service.

In this embodiment of the application, the first network node actively releases the first resource used for the first service between the first network node and the second network node, or instructs or requests the second node to release the first resource used for the first service, or instructs or requests the second node to stop the data transmission of the first service, which can avoid waste of resources caused when the sender sends multicast data normally, but no receiver receives the multicast service, and improve resource utilization.

The embodiment of the present application also provides a network node, including a processor and a communication interface, where the communication interface is configured to:
receive second data sent by a second network node.

This embodiment of the network node corresponds to the embodiment of the network node method, and each implementation process and implementation mode of the method embodiment can be applied to this embodiment of the network node, and can achieve the same technical effect.

Figure 13:
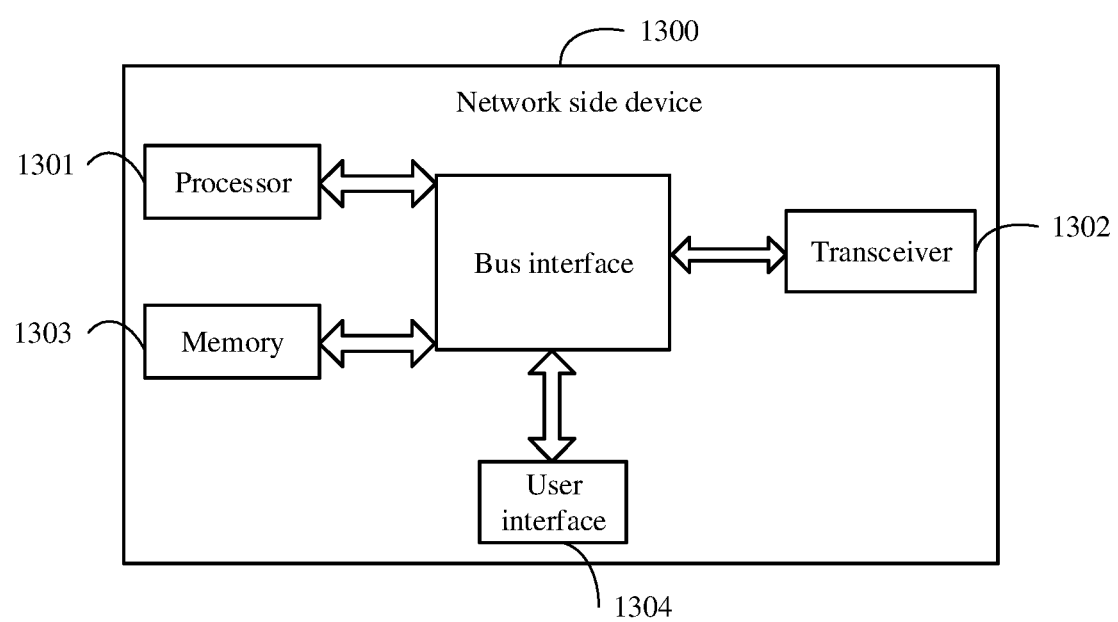
FIG. 13 is a third schematic structural diagram of a network node provided by an embodiment of the present application.

Optionally, the embodiment of the present application also provides a network node. FIG. 13 is a third structural diagram of the network node according to the embodiment of the present application. As shown in FIG. 13, the network device 1300 includes: a processor 1301, a transceiver 1302, a memory 1303, a user interface 1304 and a bus interface.

In the embodiment of the present application, the network side device 1300 further includes: a computer program stored in the memory 1303 and operable on the processor 1301, the computer program is executed by the processor 1301, so that the method executed by each module shown in FIG. 9 is performed, and the same technical effect can be achieved. To avoid repetition, it is not repeated here.

In FIG. 13, a bus architecture may include any quantity of interconnected buses and bridges, and is linked by various circuits of one or more processors represented by the processor 1301 and a memory represented by the memory 1303. The bus architecture may further link various other circuits such as a peripheral device, a voltage regulator, and a power management circuit together. These are all well-known in the art, and therefore are not described in this specification. A bus interface provides an interface. The transceiver 1302 may be a plurality of components. To be specific, the transceiver includes a transmitter and a receiver, and provides a unit configured to communicate with various other apparatuses on a transmission medium. For different user equipment, the user interface 1304 may further be an interface that can be externally or internally connected to a required device. The connected device includes but is not limited to a keypad, a display, a loudspeaker, a microphone, a joystick, and the like.

The processor 1301 is responsible for managing the bus architecture and common processing, and the memory 1303 may store data used when the processor 1301 performs an operation.

The transceiver 1302 is configured to:
receive second data sent by a second network node.

In this embodiment of the application, the first network node actively releases the first resource used for the first service between the first network node and the second network node, or instructs or requests the second node to release the first resource used for the first service, or instructs or requests the second node to stop the data transmission of the first service, which can avoid waste of resources caused when the sender sends multicast data normally, but no receiver receives the multicast service, and improve resource utilization.

Optionally, the processor 1301 is configured to:
send third data to the second network node after receiving the second data, where the third data is used for at least one of the following:
instructing the second network node whether to release the first resource;
advising the second network node whether to release the first resource;
instructing the second network node whether to stop data transmission of the first service; or
advising the second network node whether to stop data transmission of the first service.

In this embodiment of the application, the first network node actively releases the first resource used for the first service between the first network node and the second network node, or instructs or requests the second node to release the first resource used for the first service, or instructs or requests the second node to stop the data transmission of the first service, which can avoid waste of resources caused when the sender sends multicast data normally, but no receiver receives the multicast service, and improve resource utilization.

An embodiment of the present application further provides a non-transitory readable storage medium. The non-transitory readable storage medium stores a program or an instruction, and when the program or the instruction is executed by a processor, the various processes of the foregoing resource release method embodiment is performed and the same technical effects can be achieved. To avoid repetition, details are not described herein again.

The processor is a processor in the terminal in the foregoing embodiment. The non-transitory readable storage medium includes a non-transitory computer-readable storage medium, such as a computer read-only memory (ROM), a random access memory (RAM), a magnetic disk, or an optical disc.

An embodiment of the present application further provides a chip, the chip includes a processor and a communication interface, the communication interface is coupled to the processor, and the processor is configured to run programs or instructions to implement each process of the embodiment of the foregoing resource release method and the same technical effects can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include", "comprise", or any other variant thereof are intended to cover a non-exclusive inclusion, so that a process, a method, an article, or an apparatus that includes a list of elements not only includes those elements but also includes other elements which are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a computer software product. The computer software product is stored in a non-transitory storage medium (such as a ROM/RAM, a hard disk, or an optical disc), and includes several instructions for instructing a terminal (which may be a mobile phone, a computer, a server, a network device, or the like) to perform the methods described in the embodiments of this application.

The embodiments of this application are described above with reference to the accompanying drawings, but this application is not limited to the above implementations, and the above implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. A resource release method, executed by a first network node, comprising:
in a case that it is determined that a first condition is met, sending first data to a second network node; wherein the first data is used for at least one of the following:
requesting the second network node to release a first resource;
indicating the second network node to release the first resource;
requesting the second network node to stop data transmission of a first service; or indicating the second network node to stop data transmission of the first service;
wherein the first resource comprises resources used for the first service between the first network node and the second network node, and the first service is a multicast service; and
the first condition comprises at least one of the following that:
no terminal is interested in the first service;
no terminal receives the first service; or
an Internet Protocol (IP) transport layer uses a unicast transmission mode to transmit data.

2. The resource release method according to claim 1, wherein the first condition further comprises:
a service attribute of the first service comprises a delay-insensitive characteristic;
the first service is in an inactive state;
no data of the first service has been received; or
a timer expires.

3. The resource release method according to claim 1, wherein an IP transport layer uses a unicast transmission mode to transmit data comprises at least one of the following:
the first network node receives unicast address information sent by a core network; or
the first network node receives multicast address information sent by the core network.

4. The resource release method according to claim 3, wherein a target address of the first data is determined based on the unicast address information.

5. The resource release method according to claim 3, wherein the first data comprises the multicast address information.

6. The resource release method according to claim 1, wherein the first data comprises packet data sent through a user plane.

7. A resource release method, executed by a second network node, comprising:
receiving first data sent by a first network node in a case that it is determined that a first condition is met; and
based on the first data, performing at least one of the following:
ignoring the first data;
releasing a first resource;
stopping transmitting data of the first service; or
sending second data to a third network node; wherein the second data is used for at least one of the following:
requesting release of the first resource;
instructing the first resource to be released;
requesting to stop data transmission of the first service; or
indicating that data transmission of the first service is stopped; wherein the first resource comprises resources used for the first service between the first network node and the second network node, and the first service is a multicast service; and the first condition comprises at least one of the following that:

no terminal is interested in the first service;

no terminal receives the first service; or an Internet Protocol (IP) transport layer uses a unicast transmission mode to transmit data.

8. The resource release method according to claim 7, wherein after the sending second data to the third network node, the method further comprises:

receiving third data sent by the third network node; and based on the third data, performing at least one of following:

determining whether to release the first resource; or determining whether to stop data transmission of the first service.

9. The resource release method according to claim 7, wherein after the sending second data to the third network node, the method further comprises:

receiving third data sent by the third network node; and based on the third data and the first data, performing at least one of following:

determining whether to release the first resource; or determining whether to stop data transmission of the first service.

10. A resource release method, performed by a third network node, comprising:

receiving second data sent by a second network node; and sending third data to the second network node after receiving the second data, wherein the third data is used for at least one of the following:

instructing the second network node whether to release a first resource;

advising the second network node whether to release the first resource;

instructing the second network node whether to stop data transmission of a first service; or advising the second network node whether to stop data transmission of the first service; wherein the first resource comprises resources used for the first service between the first network node and the second network node, and the first service is a multicast service.

11. A network node, comprising a processor, a memory, and a program or instruction stored in the memory and executable on the processor, wherein when the program or instruction is executed by the processor, steps of the resource release method according to claim 1 are implemented.

12. A network node, comprising a processor, a memory, and a program or instruction stored in the memory and executable on the processor, wherein when the program or instruction is executed by the processor, steps of the resource release method according to claim 2 are implemented.

13. A network node, comprising a processor, a memory, and a program or instruction stored in the memory and executable on the processor, wherein when the program or instruction is executed by the processor, steps of the resource release method according to claim 3 are implemented.

14. A network node, comprising a processor, a memory, and a program or instruction stored in the memory and executable on the processor, wherein when the program or instruction is executed by the processor, steps of the resource release method according to claim 4 are implemented.

15. A network node, comprising a processor, a memory, and a program or instruction stored in the memory and executable on the processor, wherein when the program or instruction is executed by the processor, steps of the resource release method according to claim 5 are implemented.

16. A network node, comprising a processor, a memory, and a program or instruction stored in the memory and executable on the processor, wherein when the program or instruction is executed by the processor, steps of the resource release method according to claim 6 are implemented.

17. A network node, comprising a processor, a memory, and a program or instruction stored in the memory and executable on the processor, wherein when the program or instruction is executed by the processor, steps of the resource release method according to claim 7 are implemented.

18. A network node, comprising a processor, a memory, and a program or instruction stored in the memory and executable on the processor, wherein when the program or instruction is executed by the processor, steps of the resource release method according to claim 8 are implemented.

19. A network node, comprising a processor, a memory, and a program or instruction stored in the memory and executable on the processor, wherein when the program or instruction is executed by the processor, steps of the resource release method according to claim 9 are implemented.

20. A network node, comprising a processor, a memory, and a program or instruction stored in the memory and executable on the processor, wherein when the program or instruction is executed by the processor, steps of the resource release method according to claim 10 are implemented.

* * * * *